United States Patent [19]
Maddock et al.

[11] Patent Number: 4,716,656
[45] Date of Patent: Jan. 5, 1988

[54] POSITION - SENSING PROBE

[75] Inventors: Neil A. Maddock, Wotton-Under-Edge; David K. Thomas, Dursley, both of England

[73] Assignee: Renishaw plc, Wotton-Under-Edge, England

[21] Appl. No.: 29,767

[22] Filed: Mar. 24, 1987

[30] Foreign Application Priority Data

Mar. 24, 1986 [GB] United Kingdom ............... 8607199

[51] Int. Cl.$^4$ ............................................. G01B 7/03
[52] U.S. Cl. ............................................. 33/503; 33/559; 33/561
[58] Field of Search ............... 33/169 R, 172 E, 503, 33/558, 559, 560, 561

[56] References Cited

U.S. PATENT DOCUMENTS

| 3,869,799 | 3/1975 | Neuer et al. | 33/503 |
| 3,990,153 | 11/1976 | Calame | 33/503 |
| 4,130,941 | 12/1978 | Amsbury | 33/503 |
| 4,471,529 | 9/1984 | Kohler | 33/559 |
| 4,523,383 | 6/1985 | Rogers | 33/558 |
| 4,578,873 | 4/1986 | Klingler et al. | 33/559 |
| 4,621,434 | 11/1986 | Hirschmann | 33/503 |
| 4,660,296 | 4/1987 | Klingler et al. | 33/559 |

FOREIGN PATENT DOCUMENTS 1551217  8/1979  United Kingdom .
2039048  5/1980  United Kingdom .

Primary Examiner—Richard R. Stearns
Attorney, Agent, or Firm—Spencer & Frank

[57] ABSTRACT

A stylus (15) for contacting a workpiece (13) to sense its position is suspended on a movable member (16) within a fixed housing (10). The suspension is by means of three connecting units (20, 30, 40). Taking the connecting unit (20) as an example, the movable member (16) is connected to an intermediate member (22) by a first pair of links (21), while the intermediate member (22) is connected to the fixed housing by a second pair of links (23). The pairs of links are rigid in tension and compression so as to prevent rotation of the stylus about a respective one of the three orthogonal axes X, Y, Z. Nevertheless, the links permit translational movement along all three axes. The similar connecting units (30, 40) likewise permit translation on all three axes, while preventing rotation about a respective one of the axes. The use of two pairs of links (21, 23) with a rigid intermediate member (22) is equivalent to the use of a much longer single pair of links without such an intermediate member, and therefore facilitates a more compact construction of the probe for a given range of translational displacement of the stylus (15).

9 Claims, 9 Drawing Figures

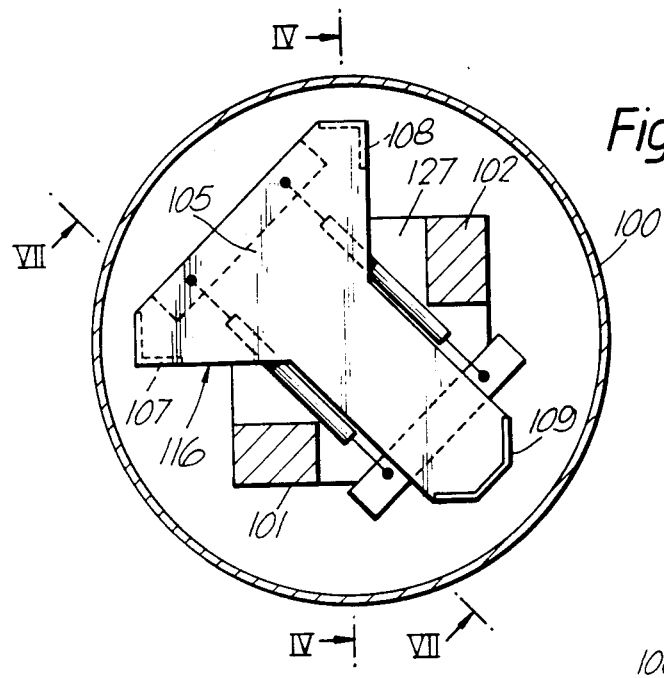
Fig. 5.
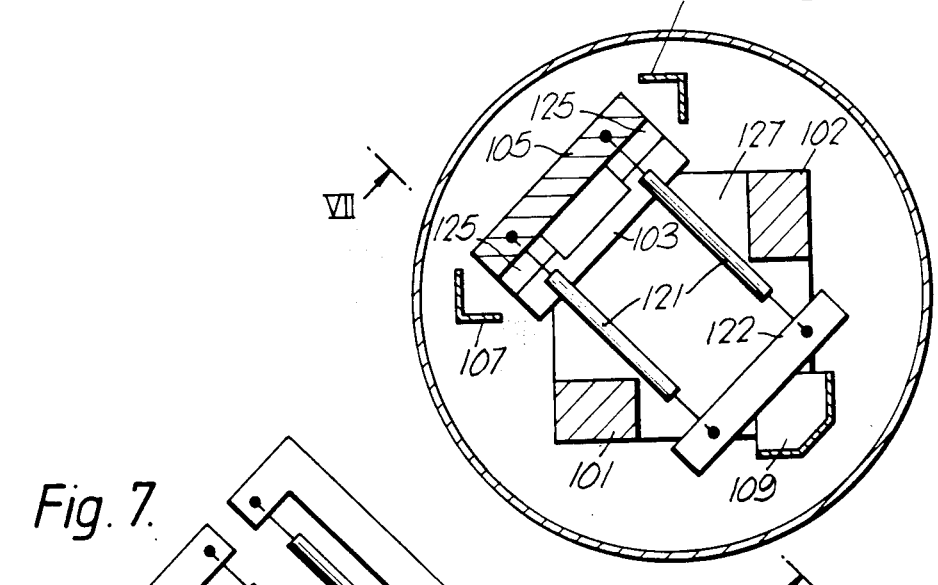
Fig. 6.
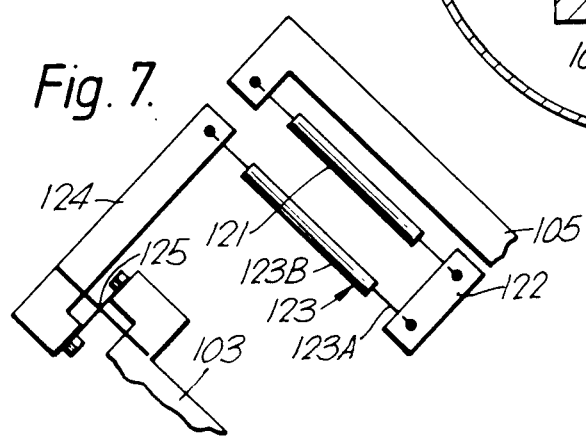
Fig. 7.

POSITION - SENSING PROBE

FIELD OF THE INVENTION

This invention relates to a probe for sensing the position of an object. Such probes are used in co-ordinate measuring machines wherein the probe and the object are supported for relative three-dimensional movement. The probe is adapted to output a signal when, by such movement, the probe is brought into engagement with a surface of the object, all with a view to determining the position of said surface relative to a datum.

DESCRIPTION OF PRIOR ART

A known contact-sensing probe (U.S. Pat. No. 4,523,383) comprises a fixed member, a movable member, three connecting units each having a reference plane, the reference planes of the units being mutually perpendicular and having a common point of intersection, each unit comprising an intermediate member, two parallel links connecting the intermediate member to the movable member, a pivot connecting the intermediate member to the fixed member, wherein the intermediate member is universally rigid, the links are universally resilient in bending but rigid in tension and compression, the three units co-operate to constrain the movable member for translational displacement but against rotation relative to the fixed member, the pivot of any one unit has a pivot axis perpendicular to the corresponding pivot axes of the other two units, the links of any one unit lie in a plane offset from the reference plane of the unit, and there is provided means for measuring any said translation.

The constraint against rotation is necessary because engagement with the object is by means of a stylus extending from the movable member and having a sensing end which is unavoidably remote from said common point of the reference planes and which would, in the absence of said constraint, rotate the movable member with consequent falsification of the measurement.

The translation involves deflection of the links relative to the rigid members. The range of translation of the movable member depends on the length of said links, i.e. the longer the links the greater the range of translation for a given permissible degree of deflection of the links. However, any increase in the length of the links leads to an undesirable increase in the overall size of the probe.

SUMMARY OF THE INVENTION

The present invention provides a position-sensing probe comprising
 a fixed member,
 a movable member which is translatable relative to the fixed member on each of three orthogonal axes,
 three connecting units connecting the movable member to the fixed member, each restraining rotation of the movable member about a respective orthogonal axis,
 each connecting unit comprising an intermediate member,
 a pair of parallel first links connecting the intermediate member to the movable member,
 a pair of parallel second links connecting the intermediate member to the fixed member,
 wherein the intermediate member is universally rigid,
 each link is rigid in tension and compression but has at least a portion which is universally flexible in bending,
 and wherein the plane of the second links of each unit lies parallel to the plane of the first links, when the links are in their normal undeflected positions.

BRIEF DESCRIPTION OF THE DRAWINGS

Two examples of probes according to this invention will now be described with reference to the accompanying drawings, wherein:
FIG. 7 is a partial view on the lines VII—VII in FIGS. 5 and 6.

DESCRIPTION OF PREFERRED EMBODIMENTS

Figure 1:
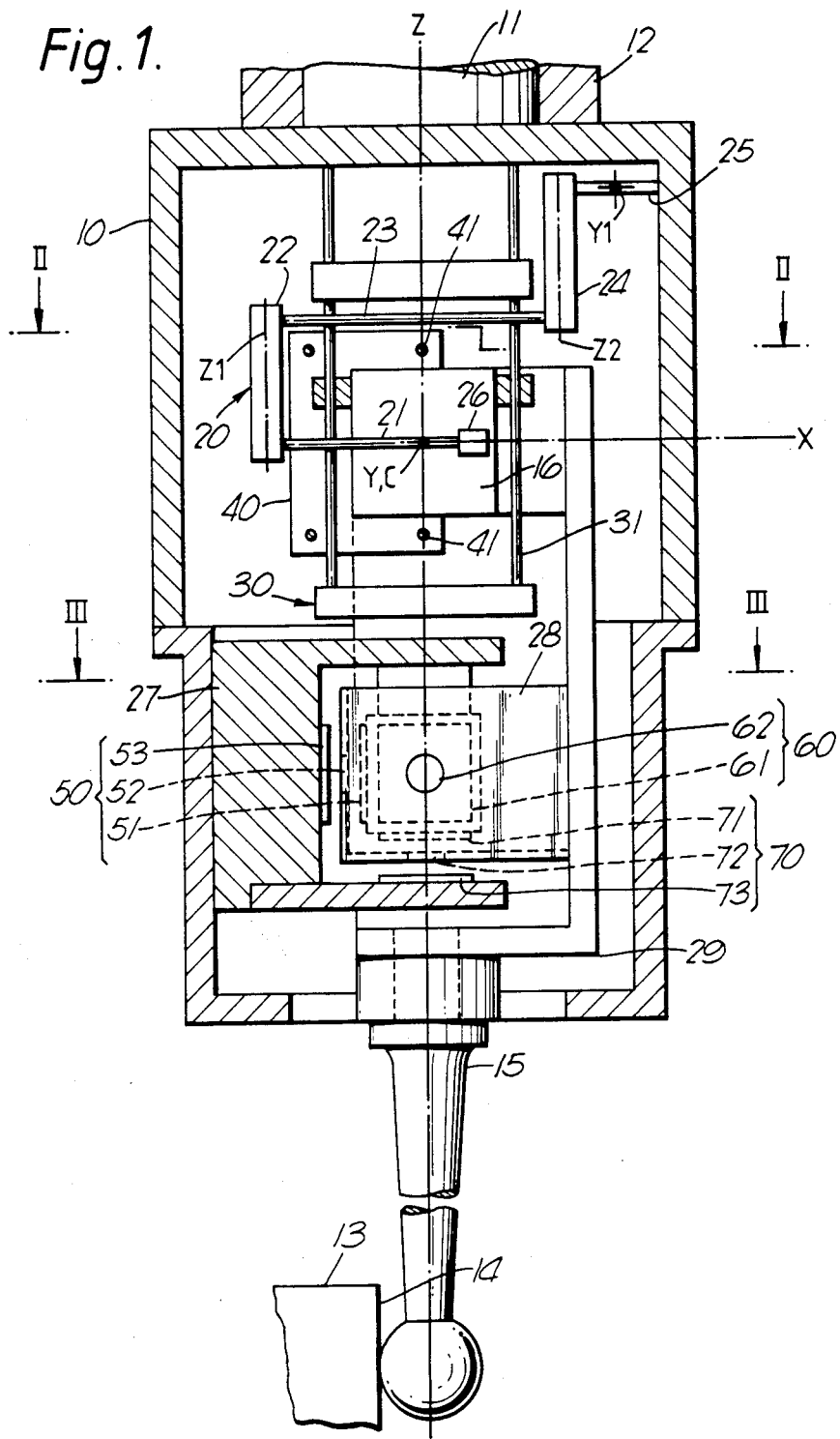
FIG. 1 is a part-sectional elevation of a first probe.
Figure 2:
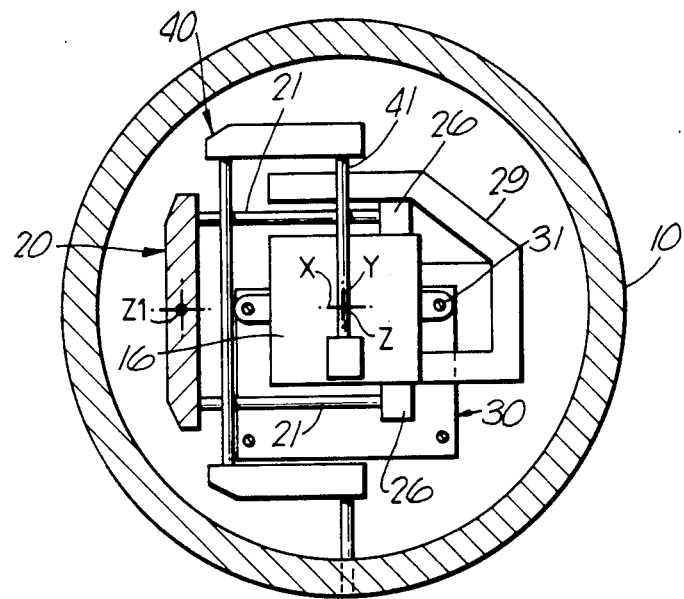
FIG. 2 is a section on the line II—II in FIG. 1.
Figure 3:
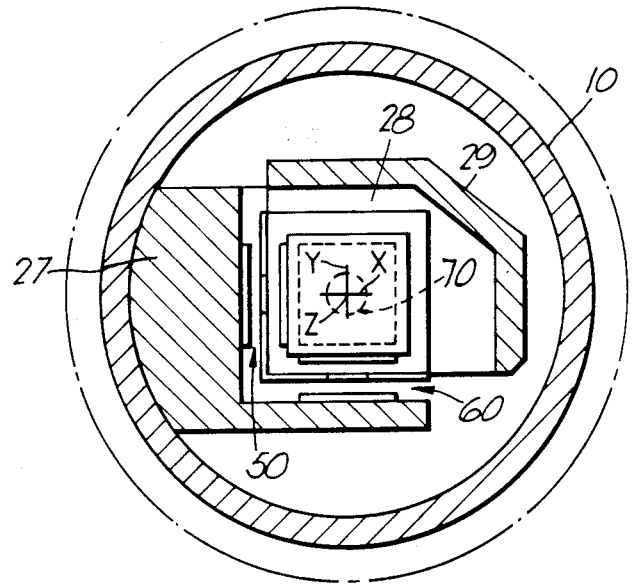
FIG. 3 is a section on the line III—III in FIG. 1.

The probe shown in FIGS. 1 to 3 has a fixed member or housing 10 having a spigot 11 whereby the housing is secured to the head 12 of a co-ordinate measuring machine (not shown). The machine supports the housing for primary three-dimensional displacement relative to a workpiece 13 with a view to determining the position of a surface 14 thereof relative to a datum.

The probe further has a movable sensing member or stylus 15 supported by the housing for secondary three-dimensional displacement relative thereto. When, during a said primary displacement of the housing relative to the workpiece, the stylus is engaged with the surface 14, there occurs a said secondary displacement of the stylus 15 relative to the housing 10. The machine is of course halted within the range of the secondary displacement.

The machine has a primary measuring system for said primary displacement, and the sensor has a secondary measuring system for said secondary displacement. The position of the surface 14 is determinable in terms of the difference between the respective measures of the primary and secondary displacements. Such a measuring process is well understood per se.

The support of the stylus 15 on the housing 10 comprises a movable member or cube 16 to which the stylus 15 is secured, and three support units 20,30,40 each connected, one independently of the other, between the cube 16 and the housing 10. The units 20,30,40 permit three-dimensional translation of the cube 16 relative to the housing but prevent rotation of the cube 16 about respective mutually perpendicular axes X,Y,Z.

The units are of similar construction, and referring by way of example to the unit 20, this comprises in serial succession a first pair of parallel links 21, a first intermediate member 22, a second pair of parallel links 23, a second intermediate member 24, and a third pair of parallel links 25. The planes of the various pairs of these links are parallel to each other when in their normal, undeflected positions. The links 21,23 are secured to the members 22,24 at ends adjacent thereto. The ends of the links 21 remote from the member 22 are secured to the cube 16 by fittings 26. The ends of the links 25 remote from the member 24 are secured to the housing 10 and define a pivot having a nominal pivot axis Y1. The links 21, 23,25 are universally resilient in bending but are rigid in tension and compression. The members 22,24 are rigid especially in torsion about axes Z1,Z2 parallel to the axes Z.

Each unit 30,40 has links and intermediate members corresponding to the links 21,23,25 and member 22,24. The axes X,Y define a reference plane XY of the unit 20 and the links 21 lie in the plane XY. The unit 30 has a corresponding reference plane XZ and the first pair of links ,31, of this unit i.e. the equivalent of the pair of links 21, lies in the plane XZ. The unit 40 has a corresponding reference plane YZ and the first pair of links ,41, of the unit 40 lies in the plane YZ. The planes XY,XZ,YZ are mutually perpendicular and have a common point of intersection C.

It will be clear that the links 21,23,25 and the members 22,24 co-operate to prevent rotation of the cube 16 about the axis Z and that the corresponding links and members of the other two units 30 and 40 prevent rotation of the cube 16 about the other two axes Y and X respectively. Therefore, the cube 16 has no rotational freedom whatever but the cube 16 is free for translation in any direction, the translation being accomodated by bending deflection of the links 21,23,25 which return to a nominally straight initial position when the displacing force ceases.

The arrangement of the first pairs of links 21,31,41 of the units 20,30,40 on the respective planes XY,XZ,YZ minimizes any forces tending to urge the links of any said pair out of parallelism. For example, a force on the stylus tending to rotate the cube 16 about the axis X acts in equal and opposite senses on the fittings 26 and in this way minimizes any twisting movement on the cube 16 due to such forces. The serial arrangement of at least two, in the present case three pairs of links distributes the bending deflection over the respective pairs which are in that sense equivalent to a single hypothetical pair of rods whose length is equal to the sum of the lengths of the respective pairs. Therefore, the arangement allows for a displacement of the cube 16, and thus of the stylus 15, over the range which would be allowable by such a hypothetical pair but without the spatial requirement thereof, i.e. over a range which is large relative to the overall size of the housing 10. This is especially apparent from the fact that the rods 21 and 23 lie at respective sides of a letter 'U' the bight of which is formed by the member 22.

The secondary measuring system, i.e. the system for measuring translational displacement of the stylus 15 relative to the housing 10, comprises three differential capacitance transducers 50,60,70 for measuring translation in the directions of the axes X,Y,Z respectively. The transducer 50 comprises a differential capacitor defined by two outer capacitor plates 51,53 situated at opposite sides of an inner capacitor plate 52. The plates 51,53 are mounted on a bracket 27 secured to the housing 10. The plate 52 is mounted on a bracket 28 secured to an elongate connecting member 29 one end of which is secured to the cube 16 and the other end of which has the stylus 15 secured thereto. The plate 52 may be surrounded by a guard ring.

The plates 51,52,53 lie in planes parallel to the YZ plane and are spaced apart in the direction of the axis X so that any translation of the stylus in the latter direction changes the spacing between the plates 51,52 relative to that between the plates 52,53. This change is detected by a transducer circuit having an output proportional to the magnitude of the translation. The translation of the stylus 15 in the direction of the axis Y or Z does not affect the output of the transducer partly because the spacing between the plates 51,52,53 is not affected by such translation and partly because, as shown, the plates 51,53 are made to have substantially larger surface areas than the plate 52 so that the latter plate does not pass out of the range of the former plates by any Y or Z translation within the translation range of the support units 30,40. For similar reasons, any guard ring should be made larger than would be conventional. The transducers 60,70 have the same plate construction as the transducer 50 and are mounted on the same brackets 27,28 except in that the plates denoted 61,62,63 and 71,72,73, of the transducers 60 and 70 are spaced apart in the directions of the axes Y and Z respectively. In other words, the spacing of the plates of any of the transducers is perpendicular to the spacing of the plates of the other two transducers. The arrangement is such that the plates 52,62,72 lie at three adjacent surfaces of a notional cube, and the plates 51,61,71 and 53,63,73 are of course parallel to the plates 52,62,72 respectively. In this way there is achieved a compact construction of the transducers with good rigidity of the relative position of the plates.

The probe shown in FIGS. 4–9 will now be described.

Figure 4:
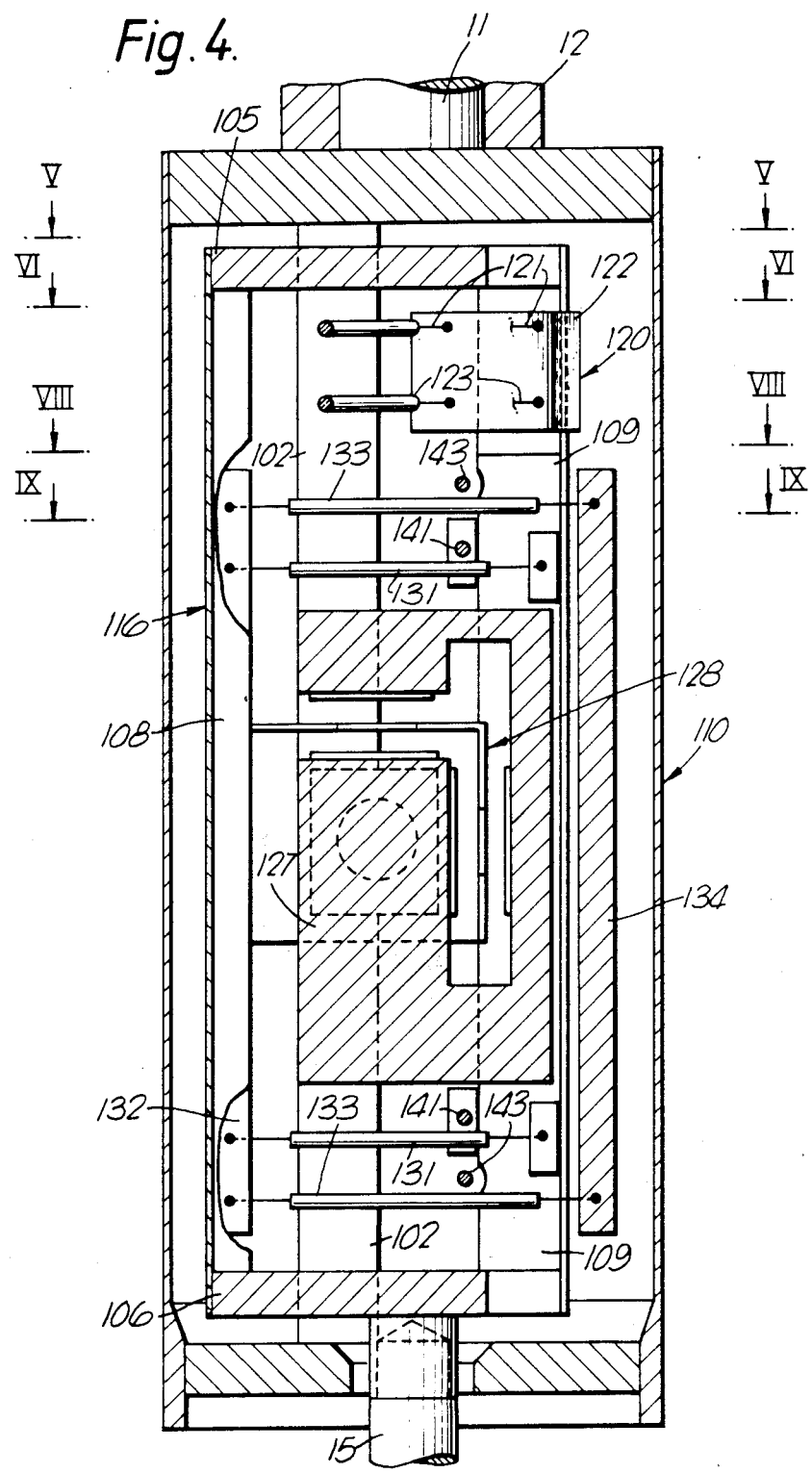
FIG. 4 is a part-sectional elevation of the second probe, on the line IV—IV in FIG. 5,
 FIGS. 5, 6, 8 and 9 are sections on the lines V—V, VI—VI, VIII—VIII and IX—IX respectively in FIG. 4.

Referring to FIGS. 4 and 5, this probe has a fixed member 110 comprising a housing 100 and two vertical pillars 101, 102. A stylus 15 is fast with a movable member 116 which consists of a top plate 105, a bottom plate 106, and three vertical struts 107, 108, 109 which extend between the top and bottom plates. As previously, the housing 110 is supported by a spigot 11 in the head 12 of a co-ordinate measuring machine. Also as previously, the movable member 116 is supported within the housing 110 by three connecting units, which permit translation of the movable member on each of three orthogonal axes, each connecting unit preventing rotation about a respective one of these axes.

The first of these connecting units, 120, will be described with especial reference to FIGS. 4, 6 and 7. It comprises a first pair of parallel links 121 extending from one side of the top plate 105 of the movable member to a first intermediate member 122, and a second pair of parallel links 123 extending from the first intermediate member 122 to a second intermediate member 124. The links 121, 123 and the intermediate members 122, 124 are analogous to the corresponding links and intermediate members 21, 23, 22, 24 in the previous embodiment. However, in place of the links 25, the second intermediate member 124 is pivoted to a portion 103 of the fixed member, which is fastened to the pillars 101,102, by means of two pairs of crossed planar springs 125. These serve the same purpose as the pair of parallel lnks 25 in the previous embodiments, namely facilitating translation of the movable member in the direction parallel to the links 121,123 by pivoting of the intermediate member 124. It would be possible to use two single planar springs instead of two crossed pairs, but the crossed pairs are preferred for their superior resistance to torsional moments on the movable member.

It will be appreciated that such a second intermediate member and its pivotable connection with the fixed member are not absolutely essential, for example if the links 121 were sufficiently spaced from the links 123 that such motion could be accommodated by tilting of the intermediate member 122.

Since the operation of the first connection unit 120 is similar to that of the corresponding unit 20 in the previous embodiment, it will not be described further.

The second connection unit will be described with particular reference to FIGS. 4, 8 and 9. It comprises a first pair of parallel links 131 extending from the vertical strut 109 to a first intermediate member 132 in the form of a vertical bar. A second pair of links 133 extends back from the first intermediate member 132 to a second intermediate member 134. The second intermediate member 134 is hinged to the pillar 101 of the fixed member by two vertically spaced pairs of crossed planar springs 135.

Figure 8:
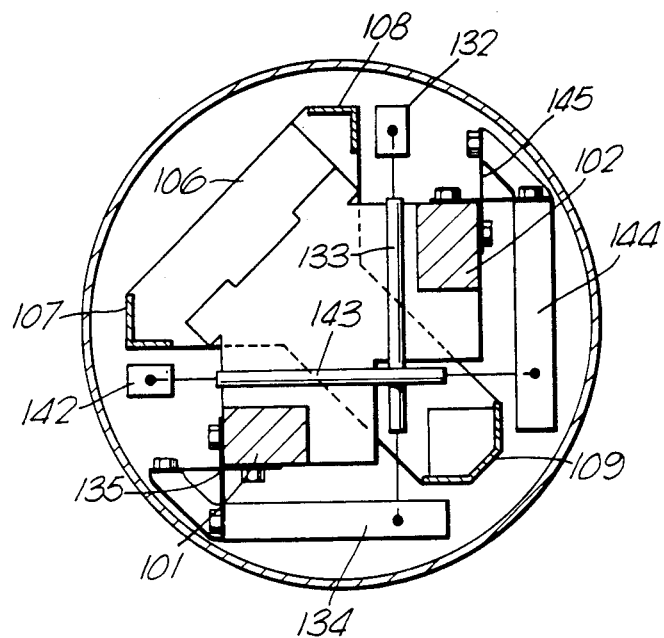
Figure 9:
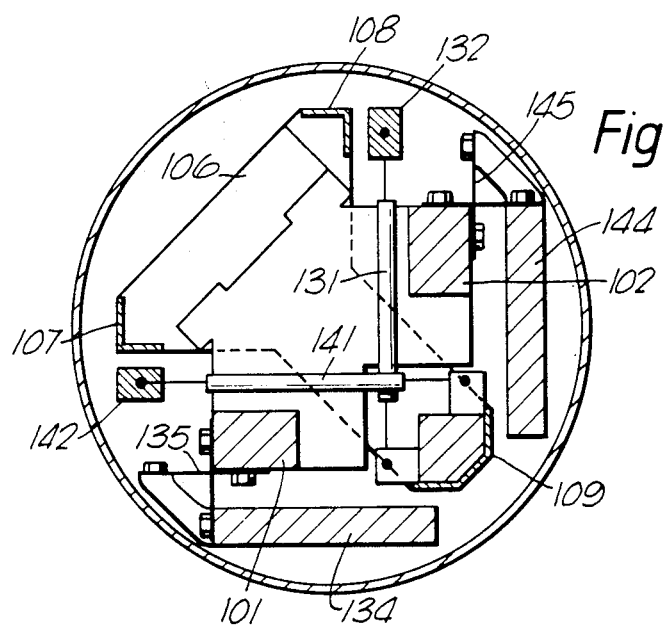

Similarly, as also seen in FIGS. 4, 8 and 9, the third connection units comprises a first pair of links 141, a second pair of links 143, a first intermediate member 142 and a second intermediate member 144, pivoted to the pillar 102 by crossed springs 145.

The three connecting units permit translation of the movable member in any of the orthogonal directions X, Y and Z. The first connecting unit 120 prevents rotation about the Z axis, the second connecting unit prevents rotation about the X axis, while the third connection unit prevents rotation about the Y axis.

It will be seen that, unlike the previous embodiment, the planes of the first pair of links 131 and of the second pair of links 133 are co-incident. Similarly, the planes of the first pair of links 141 and of the second pair of links 143 are co-incident. Furthermore, the links 131 are quite widely spaced from each other, compared with the previous embodiments, one being near the top of the probe and the other being near the bottom. A similar wide spacing applies to the links 133, the links 141 and the links 143. This wide spacing improves the resistance of the connecting unit to torsional loading.

All the links 121, 123, 131, 133, 141, 143 are constructed from wires or rods, which can bend resiliently in any direction but which are resistant to tension and compression. However, to cause the links to bend only at portions close to the ends, the middle portions are covered by relatively rigid sleeves. This can be seen, for example, in FIG. 7 where the resilient wire of the links 123 has been labelled 123A, while its covering sleeve has been labelled 123B.

The transducer arrangement can be seen in FIG. 4. It comprises a fixed block 127, which is attached to and suspended between the fixed pillars 101, 102. A movable transducer block 128 is attached to and suspended between the three vertical struts 107, 108, 109. As previously, the movable part of the transducer comprises three capacitor plates which are arranged on three adjacent, orthogonal sides of a notional cube. Since the transducer arrangement is the same as shown in FIGS. 1 and 3, it will not be described further. Of course, if desired it would be possible for the transducer block 128 to be mounted on the fixed structure, with the transducer block 127 being on the movable member.

The advantages of the suspension arrangements described are as follows. Firstly, referring by way of example to the connection unit 20 in FIG. 1, since the two pairs of links 21, 23 are effectively doubled back on each other, they provide the same function as a single pair of links of greater length. Secondly, if the stylus 15 is moved in the Z direction, any tendency of the links 21 to cause a lateral loading in the X direction of the movable member (and hence possible to induce an X-motion as well as a Z-motion) is cancelled out by an almost equal and opposite tendency caused by the links 23. Such cancellation is most pronounced if the pairs of links have the same length, for example, as with the links 121, 123 in FIG. 4.

If desired, non-capacitative transducer arrangements can be provided in either embodiment. For example, the fixed capacitor plates 51, 53 can be replaced by transducer elements in the form of inductive coils, and the movable plate 52 replaced by a somewhat large plate of magnetic or conductive material. Movement of the movable plate then has a differential effect on the mutual inductances of the coils, which can be measured. Similar inductive transducer arrangements then also replace the plates 61, 62, 63 and 71, 72, 73.

We claim:

1. A position-sensing probe comprising
   a fixed member,
   a movable member, which is translatable relative to the fixed member on each of three orthogonal axes,
   three connecting units connecting the movable member to the fixed member, each restraining rotation of the movable member about a respective orthogonal axis,
   each connecting unit comprising
   an intermediate member,
   a pair of parallel first links connecting the intermediate member to the movable member,
   a pair of parallel second links connecting the intermediate member to the fixed member,
   wherein the intermediate member is universally rigid,
   each link is rigid in tension and compression but has at least a portion which is universally flexible in bending,
   and wherein the plane of the second links of each unit lies parallel to the plane of the first links, when the links are in their normal, undeflected positions.

2. A probe according to claim 1 wherein the relative position of the links and the intermediate member of each unit is such that, notionally, the first and second links lie at the respective sides of a letter 'U' the bight of which is formed by the intermediate member.

3. A probe according to claim 1 wherein the plane of the second links of each unit coincides with the plane of the first links of the respective unit.

4. A probe according to claim 1 wherein each connecting unit further comprises a second universally rigid intermediate member which is pivotably attached to the fixed member, the pair of second links being connected to the fixed member via the second intermediate member.

5. A probe according to claim 4 wherein the second intermediate member is pivotably attached to the fixed member by crossed planar springs.

6. A position-sensing probe comprising
   a fixed member
   a movable member which is translatable relative to the fixed member on each of three orthogonal axes, and a transducer arrangement for measuring the translation of the moveable member of each of the orthogonal axes, the transducer arrangement comprising three transducer plates on one said member, the plates being arranged on three orthogonal planes defining three sides of a cube; and three pairs of transducer elements on the other said member, the elements of each pair confronting a respective said plate on opposite sides thereof and acting differentially therewith.

7. A probe according to claim 6 wherein the transducer plates are on the movable member and the transducer elements are on the fixed member.

8. A probe according to claim 6 wherein each transducer plate forms a differential capacitor with its corresponding pair of transducer elements.

9. A probe according to claim 8 wherein each transducer plate has a substantially smaller effective surface area than its corresponding transducer elements.

* * * * *